(12) United States Patent
Muenzenberger et al.

(10) Patent No.: US 11,628,321 B2
(45) Date of Patent: Apr. 18, 2023

(54) FIRESTOP COLLAR

(71) Applicant: Hilti Aktiengesellschaft, Schaan (LI)

(72) Inventors: Herbert Muenzenberger, Wiesbaden (DE); Hans Henning Artmann, Munich (DE); Markus Koegler, Buchloe (DE); Egon Berghofer, Scheuring (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 17/934,364

(22) Filed: Sep. 22, 2022

(65) Prior Publication Data
US 2023/0013036 A1    Jan. 19, 2023

Related U.S. Application Data (63) Continuation of application No. 16/799,236, filed on Feb. 24, 2020, which is a continuation of application No. 15/545,816, filed as application No. PCT/EP2016/059333 on Apr. 27, 2016, now Pat. No. 10,610,711.

(30) Foreign Application Priority Data

Apr. 27, 2015  (EP) .................... 15165185

(51) Int. Cl.
| A62C 2/06 | (2006.01) |
| F16L 5/04 | (2006.01) |
| H02G 3/04 | (2006.01) |
| H02G 3/22 | (2006.01) |
| E04B 1/94 | (2006.01) |

(52) U.S. Cl.
CPC .............. *A62C 2/065* (2013.01); *E04B 1/947* (2013.01); *F16L 5/04* (2013.01); *H02G 3/0412* (2013.01); *H02G 3/22* (2013.01)

(58) Field of Classification Search
CPC . A62C 2/065; F16L 5/04; E04B 1/947; H02G 3/0412; H02G 3/22
USPC ................................ 52/219, 220.8, 221, 232
See application file for complete search history.

(56) References Cited

U.S. PATENT DOCUMENTS

| 3,143,208 A | 8/1964 | Sizemore, Jr. |
| 3,396,129 A | 8/1968 | Yeadon et al. |
| 4,338,412 A | 7/1982 | von Bonin |
| 4,367,295 A | 1/1983 | von Bonin |

(Continued)

FOREIGN PATENT DOCUMENTS

| AU | B-30326/95 | 3/1996 |
| CA | 2 787 642 | 3/2013 |

(Continued)

OTHER PUBLICATIONS

Document 1, Filed Sep. 22, 2022, "Complaint for Patent Infringement" in Case 1:22-cv-01248-CFC (in the U.S. District Court for the District of Delaware).

(Continued)

*Primary Examiner* — Brian E Glessner
*Assistant Examiner* — Adam G Barlow
(74) *Attorney, Agent, or Firm* — Grüneberg and Myers PLLC (57) ABSTRACT

A firestop collar for sealing of openings, especially of line penetrations, that pass through walls or ceilings, has a frame and a block of optionally intumescent material disposed therein.

7 Claims, 3 Drawing Sheets

(56) References Cited

U.S. PATENT DOCUMENTS

| | | | |
|---|---|---|---|
| 4,380,593 A | 4/1983 | Von Bonin et al. | |
| 4,460,804 A | 7/1984 | Svejkovsky | |
| 4,538,389 A | 9/1985 | Heinen | |
| 4,857,364 A | 8/1989 | von Bonin | |
| 5,058,341 A * | 10/1991 | Harbeke, Jr. | A62C 2/065 52/317 |
| 5,103,609 A * | 4/1992 | Thoreson | A62C 2/065 52/232 |
| 5,155,957 A * | 10/1992 | Robertson | F16L 5/04 52/220.8 |
| 5,173,515 A | 12/1992 | von Bonin et al. | |
| 5,309,688 A | 5/1994 | Robertson | |
| 5,347,767 A | 9/1994 | Roth | |
| 5,351,448 A * | 10/1994 | Gohlke | H02G 3/22 52/220.8 |
| 5,390,458 A | 2/1995 | Menchetti | |
| 5,421,127 A * | 6/1995 | Stefely | A62C 2/06 52/220.8 |
| 5,452,551 A | 9/1995 | Charland et al. | |
| 5,456,050 A | 10/1995 | Ward | |
| 5,498,466 A * | 3/1996 | Navarro | B32B 15/04 428/305.5 |
| 5,586,739 A * | 12/1996 | Gantner | F16L 5/04 248/500 |
| 5,765,318 A | 6/1998 | Michelsen | |
| 5,887,395 A * | 3/1999 | Navarro | F16L 5/04 428/920 |
| 5,887,396 A * | 3/1999 | Thoreson | A62C 2/065 52/220.8 |
| 5,934,333 A | 8/1999 | Münzenberger et al. | |
| 5,970,670 A * | 10/1999 | Hoffman | A62C 2/065 52/317 |
| 6,029,412 A * | 2/2000 | Gohlke | F16L 5/04 137/75 |
| 6,125,608 A | 10/2000 | Charlson | |
| 6,172,052 B1 | 1/2001 | Cook et al. | |
| 6,176,052 B1 | 1/2001 | Takahashi | |
| 6,360,502 B1 * | 3/2002 | Stahl, Jr. | A62C 2/065 52/220.8 |
| 6,426,463 B2 | 7/2002 | Münzenberger et al. | |
| 6,477,813 B2 * | 11/2002 | Andresen | H02G 3/0412 52/220.8 |
| 6,632,999 B2 | 10/2003 | Sempliner et al. | |
| 6,725,615 B1 * | 4/2004 | Porter | F16L 5/04 52/99 |
| 6,732,481 B2 | 5/2004 | Stahl, Sr. | |
| D502,147 S | 2/2005 | Stahl, Sr. | |
| 6,928,777 B2 | 8/2005 | Cordts | |
| 6,935,080 B2 | 8/2005 | Allwein et al. | |
| 7,082,730 B2 * | 8/2006 | Monden | F16L 5/04 52/220.8 |
| 7,240,905 B1 | 7/2007 | Stahl, Sr. | |
| 7,373,761 B2 | 5/2008 | Stahl, Sr. | |
| 7,427,050 B2 | 9/2008 | Stahl, Sr. et al. | |
| 7,478,503 B2 | 1/2009 | Milani et al. | |
| 7,521,495 B2 | 4/2009 | Horacek et al. | |
| 7,523,590 B2 | 4/2009 | Stahl, Sr. | |
| 7,560,644 B2 | 7/2009 | Ford et al. | |
| 7,596,914 B2 * | 10/2009 | Stahl, Sr. | F16L 5/04 52/220.8 |
| 7,685,792 B2 | 3/2010 | Stahl, Sr. et al. | |
| 7,694,474 B1 | 4/2010 | Stahl, Sr. et al. | |
| 7,797,893 B2 | 9/2010 | Stahl, Sr. et al. | |
| 7,856,775 B2 | 12/2010 | Stahl, Jr. | |
| 7,867,591 B2 | 1/2011 | Sieber et al. | |
| 8,051,614 B1 | 11/2011 | Peck et al. | |
| D657,232 S | 4/2012 | Stahl, Sr. et al. | |
| 8,188,382 B2 | 5/2012 | Monden et al. | |
| 8,266,854 B2 | 9/2012 | Reddicliffe | |
| 8,336,832 B2 * | 12/2012 | Van Walraven | F16L 5/04 52/220.8 |
| 8,375,666 B2 | 2/2013 | Stahl, Jr. et al. | |
| 8,397,452 B2 | 3/2013 | Stahl, Sr. et al. | |
| 8,584,415 B2 | 11/2013 | Stahl, Jr. et al. | |
| 8,590,231 B2 | 11/2013 | Pilz | |
| 8,671,632 B2 | 3/2014 | Pilz et al. | |
| 8,672,275 B2 * | 3/2014 | Van Walraven | H02G 3/0412 248/539 |
| 8,776,462 B2 * | 7/2014 | Foerg | A62C 2/065 52/220.8 |
| 8,782,977 B2 | 7/2014 | Burgess | |
| 8,793,946 B2 | 8/2014 | Stahl, Jr. et al. | |
| 8,833,478 B2 | 9/2014 | Zernach et al. | |
| 8,869,475 B2 | 10/2014 | Lopes | |
| 8,887,458 B2 | 11/2014 | Lopes | |
| 8,910,949 B2 | 12/2014 | Åkesson | |
| 8,955,275 B2 | 2/2015 | Stahl, Jr. | |
| 9,046,194 B2 | 6/2015 | Gandolfo et al. | |
| 9,121,527 B2 | 9/2015 | Munzenberger et al. | |
| 9,140,387 B2 * | 9/2015 | Foerg | F16L 5/04 |
| 9,145,987 B2 * | 9/2015 | Muenzenberger | F16B 15/0015 |
| 9,157,232 B2 | 10/2015 | Stahl, Jr. | |
| 9,162,093 B2 | 10/2015 | Foerg et al. | |
| 9,586,066 B2 * | 3/2017 | Klein | H02G 3/0412 |
| 9,861,843 B2 * | 1/2018 | Paetow | A62C 2/065 |
| 2005/0133242 A1 | 6/2005 | Kreutz | |
| 2006/0037264 A1 | 2/2006 | Paetow et al. | |
| 2006/0060369 A1 | 3/2006 | Hemingway et al. | |
| 2006/0138251 A1 | 6/2006 | Stahl, Sr. | |
| 2006/0160926 A1 | 7/2006 | Horacek et al. | |
| 2007/0125018 A1 | 6/2007 | Stahl, Sr. | |
| 2007/0151183 A1 * | 7/2007 | Stahl, Sr. | F16L 5/04 52/317 |
| 2007/0175125 A1 | 8/2007 | Stahl, Sr. et al. | |
| 2007/0204540 A1 | 9/2007 | Stahl, Sr. et al. | |
| 2007/0261339 A1 | 11/2007 | Stahl, Sr. et al. | |
| 2007/0261343 A1 | 11/2007 | Stahl, Sr. et al. | |
| 2009/0126297 A1 | 5/2009 | Stahl, Jr. | |
| 2010/0326678 A1 | 12/2010 | Monden et al. | |
| 2011/0011019 A1 | 1/2011 | Stahl, Jr. et al. | |
| 2011/0088342 A1 | 4/2011 | Stahl, Sr. et al. | |
| 2011/0094759 A1 | 4/2011 | Lopes | |
| 2011/0180278 A1 * | 7/2011 | Magnay | A62C 2/065 169/48 |
| 2011/0210222 A1 * | 9/2011 | Van Walraven | A62C 2/06 248/315 |
| 2012/0207961 A1 * | 8/2012 | Drexl | A62C 2/065 442/136 |
| 2012/0304979 A1 * | 12/2012 | Munzenberger | H02G 3/088 126/314 |
| 2013/0061544 A1 | 3/2013 | Stahl, Jr. et al. | |
| 2013/0061545 A1 * | 3/2013 | Van Walraven | H02G 3/088 248/315 |
| 2013/0091790 A1 | 4/2013 | Stahl, Jr. et al. | |
| 2013/0097948 A1 * | 4/2013 | Burgess | E04B 2/7409 52/232 |
| 2013/0104475 A1 | 5/2013 | Foerg et al. | |
| 2013/0161030 A1 | 6/2013 | Munzenberger et al. | |
| 2013/0205694 A1 | 8/2013 | Stahl, Jr. | |
| 2013/0277918 A1 | 10/2013 | Fitzgerald et al. | |
| 2013/0307225 A1 | 11/2013 | Boyd | |
| 2013/0331489 A1 * | 12/2013 | Kreh | C08K 13/04 524/308 |
| 2014/0020915 A1 | 1/2014 | Lopes | |
| 2014/0077043 A1 * | 3/2014 | Foerg | H02G 3/0412 248/74.1 |
| 2014/0137494 A1 | 5/2014 | Stahl, Jr. et al. | |
| 2014/0260015 A1 | 9/2014 | McConnell et al. | |
| 2014/0360115 A1 | 12/2014 | Stahl, Jr. | |
| 2015/0007515 A1 | 1/2015 | Stahl, Jr. | |
| 2015/0047276 A1 | 2/2015 | Gandolfo et al. | |
| 2015/0135622 A1 | 5/2015 | Muenzenberger et al. | |
| 2015/0251028 A1 | 9/2015 | Klein et al. | |
| 2017/0354836 A1 | 12/2017 | Lopes et al. | |

FOREIGN PATENT DOCUMENTS

| | | |
|---|---|---|
| CA | 2 841 523 | 9/2014 |
| CA | 2 849 597 | 12/2014 |
| DE | 216225 | 11/1909 |
| DE | 29 42 333 | 4/1981 |

(56) References Cited

FOREIGN PATENT DOCUMENTS

| | | |
|---|---|---|
| DE | 30 25 309 | 2/1982 |
| DE | 30 41 731 | 6/1982 |
| DE | 33 02 416 | 7/1984 |
| DE | 34 11 327 | 10/1985 |
| DE | 39 17 518 | 12/1990 |
| DE | 94 11 293 U1 | 9/1994 |
| DE | 196 53 503 | 6/1998 |
| DE | 100 43 430 | 3/2002 |
| DE | 103 26 775 | 4/2004 |
| DE | 20 2005 004 339 U1 | 10/2005 |
| DE | 20 2006 019 593 U1 | 4/2007 |
| DE | 10 2010 054 621 | 6/2012 |
| DE | 10 2011 105 576 | 12/2012 |
| DE | 10 2011 089 531 | 6/2013 |
| DE | 20 2013 103 170 U1 | 9/2013 |
| EP | 0 043 952 | 2/1984 |
| EP | 0 116 846 | 8/1984 |
| EP | 0 051 106 | 3/1985 |
| EP | 0 061 024 | 5/1985 |
| EP | 0 158 165 | 10/1985 |
| EP | 0 274 068 | 7/1988 |
| EP | 0 869 303 | 10/1998 |
| EP | 0 988 873 | 3/2000 |
| EP | 1 641 895 | 4/2006 |
| EP | 2 273 639 | 1/2011 |
| EP | 2 339 708 | 6/2011 |
| EP | 2 455 135 | 5/2014 |
| EP | 1 347 549 | 3/2017 |
| ES | 2 312 276 | 2/2009 |
| GB | 2 111 624 | 7/1983 |
| GB | 2 216 220 | 10/1989 |
| GB | 2 233 725 | 1/1991 |
| GB | 2 281 859 | 3/1995 |
| GB | 2 334 770 | 9/1999 |
| GB | 2 444 400 | 6/2008 |
| GB | 2 457 152 | 8/2009 |
| IE | 902358 | 6/1991 |
| JP | 2-286990 | 11/1990 |
| JP | 2000-240854 | 9/2000 |
| JP | 2008-121413 | 5/2008 |
| JP | 2012-92644 | 5/2012 |
| JP | 2014-148998 | 8/2014 |
| JP | 2014-212617 | 11/2014 |
| JP | 2015-057560 | 3/2015 |
| NL | 8700459 | 9/1988 |
| WO | 97/04838 | 2/1997 |
| WO | 2002/037011 | 5/2002 |
| WO | 2004/015319 | 2/2004 |
| WO | 2007/061572 | 5/2007 |
| WO | 2008/140399 | 11/2008 |
| WO | 2013/160776 | 10/2013 |
| WO | 2014/071362 | 5/2014 |
| WO | 2014/081446 | 5/2014 |
| WO | 2015/023313 | 2/2015 |
| WO | 2015/055855 | 4/2015 |
| WO | 2016/089290 | 6/2016 |

OTHER PUBLICATIONS

Exhibit 1 to Document 1, Filed Sep. 22, 2022, "Complaint for Patent Infringement" in Case 1:22-cv-01248-CFC (in the U.S. District Court for the District of Delaware).
Exhibit 2 to Document 1, Filed Sep. 22, 2022, "Complaint for Patent Infringement" in Case 1:22-cv-01248-CFC (in the U.S. District Court for the District of Delaware).
Exhibit 3 to Document 1, Filed Sep. 22, 2022, "Complaint for Patent Infringement" in Case 1:22-cv-01248-CFC (in the U.S. District Court for the District of Delaware).
Exhibit 4 to Document 1, Filed Sep. 22, 2022, "Complaint for Patent Infringement" in Case 1:22-cv-01248-CFC (in the U.S. District Court for the District of Delaware).
Exhibit 5 to Document 1, Filed Sep. 22, 2022, "Complaint for Patent Infringement" in Case 1:22-cv-01248-CFC (in the U.S. District Court for the District of Delaware).
Exhibit 6 to Document 1, Filed Sep. 22, 2022, "Complaint for Patent Infringement" in Case 1:22-cv-01248-CFC (in the U.S. District Court for the District of Delaware).
Exhibit 7 to Document 1, Filed Sep. 22, 2022, "Complaint for Patent Infringement" in Case 1:22-cv-01248-CFC (in the U.S. District Court for the District of Delaware).
Exhibit 8 to Document 1, Filed Sep. 22, 2022, "Complaint for Patent Infringement" in Case 1:22-cv-01248-CFC (in the U.S. District Court for the District of Delaware).
Exhibit 9 to Document 1, Filed Sep. 22, 2022, "Complaint for Patent Infringement" in Case 1:22-cv-01248-CFC (in the U.S. District Court for the District of Delaware).
Exhibit 10 to Document 1, Filed Sep. 22, 2022, "Complaint for Patent Infringement" in Case 1:22-cv-01248-CFC (in the U.S. District Court for the District of Delaware).
Exhibit 11 to Document 1, Filed Sep. 22, 2022, "Complaint for Patent Infringement" in Case 1:22-cv-01248-CFC (in the U.S. District Court for the District of Delaware).
Exhibit 12 to Document 1, Filed Sep. 22, 2022, "Complaint for Patent Infringement" in Case 1:22-cv-01248-CFC (in the U.S. District Court for the District of Delaware).
Exhibit 13 to Document 1, Filed Sep. 22, 2022, "Complaint for Patent Infringement" in Case 1:22-cv-01248-CFC (in the U.S. District Court for the District of Delaware).
Exhibit 14 to Document 1, Filed Sep. 22, 2022, "Complaint for Patent Infringement" in Case 1:22-cv-01248-CFC (in the U.S. District Court for the District of Delaware).
Exhibit 15 to Document 1, Filed Sep. 22, 2022, "Complaint for Patent Infringement" in Case 1:22-cv-01248-CFC (in the U.S. District Court for the District of Delaware).
Exhibit 16 to Document 1, Filed Sep. 22, 2022, "Complaint for Patent Infringement" in Case 1:22-cv-01248-CFC (in the U.S. District Court for the District of Delaware).
Exhibit 17 to Document 1, Filed Sep. 22, 2022, "Complaint for Patent Infringement" in Case 1:22-cv-01248-CFC (in the U.S. District Court for the District of Delaware).
Exhibit 18 to Document 1, Filed Sep. 22, 2022, "Complaint for Patent Infringement" in Case 1:22-cv-01248-CFC (in the U.S. District Court for the District of Delaware).
Exhibit 19 to Document 1, Filed Sep. 22, 2022, "Complaint for Patent Infringement" in Case 1:22-cv-01248-CFC (in the U.S. District Court for the District of Delaware).
Exhibit 20 to Document 1, Filed Sep. 22, 2022, "Complaint for Patent Infringement" in Case 1:22-cv-01248-CFC (in the U.S. District Court for the District of Delaware).
Exhibit 21 to Document 1, Filed Sep. 22, 2022, "Complaint for Patent Infringement" in Case 1:22-cv-01248-CFC (in the U.S. District Court for the District of Delaware).
Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 1 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 2 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 3 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 4 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 5 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).

(56) References Cited

OTHER PUBLICATIONS

Exhibit 6 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 7 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 8 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 9 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 10 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 11 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 12 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 13 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 14 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 15 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 16 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 17 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 18 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 19 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 20 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 21 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 22 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 23 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 24 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 25 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 26 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 27 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 28 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 29 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 30 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 31 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 32 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 33 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 34 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 35 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 36 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 37 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 38 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 39 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 40 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).

(56) References Cited

OTHER PUBLICATIONS

Exhibit 41 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 42 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 43 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 44 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 45 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
International Search Report dated Jul. 29, 2016, in PCT/EP2016/059333, filed Apr. 27, 2016.
Bautechnisches Prüfamt Flamro Brandschutz Systeme GmbH Zulassungsgegenstand: Kabelabschottung (Kombiabschottung) "*System FLAMRO BSS*", der Feuerwiderstandsklasse S90 nach DIN 4102-9 (Technical Inspection Office Flamro Brandschutz Systeme GmbH Subject of approval: Cable insulation (combi insulation) "*System FLAMRO BSS*", the fire resistance class S90 according to DIN 4102-9), Feb. 1, 2014 (Feb. 1, 2014) XP055586872, found in the internet: URL:http://www.flamro.de/wp-content/uploads/2015/05/Z-19.15-1588-bis-2019.pdf [found on May 8, 2019], with partial English translation of European Examination Report dated May 21, 2019, 15 pages.

\* cited by examiner

FIRESTOP COLLAR

This application is a continuation of U.S. application Ser. No. 16/799,236, filed on Feb. 24, 2020, which is a continuation of U.S. application Ser. No. 15/545,816, filed on Jul. 24, 2017, which was the National Stage entry under § 371 of International Application No. PCT/EP2016/059333, filed on Apr. 27, 2016, and which claims the benefit of European Application No. 15165185.8, filed on Apr. 27, 2015, all of which are incorporated in their entireties by reference.

DESCRIPTION

The invention relates to a firestop collar for sealing of openings, especially of line penetrations, that pass through walls or ceilings, with a frame and a block of optionally intumescent material disposed therein.

Firestop collars, which are capable of sealing line penetrations of non-fire-resistant pipes or cables in ceilings or walls in the event of fire, in order to prevent the spread of fire and smoke in buildings, are known in the most diverse configurations. The firestop collars usually contain an intumescent material, which is disposed around the lines, and a frame of sheet metal, which jackets the intumescent material and serves to fasten the intumescent material to walls or ceilings. The firestop collars are usually attached around the penetrating lines upstream from the openings, since mounting is simpler there.

As an example, DE 10 2011 089 531 A1 discloses a firestop collar of the type mentioned in the introduction, consisting of a block of intumescent material and a frame surrounding this.

EP 2 455 135 A2 teaches a fire-protection element which, in addition to the intumescent material, has a reinforcing inner lining, which stabilizes the ash layer formed in the event of fire.

A disadvantage of the known firestop collars is that they are suitable only for certain opening cross sections. This leads to the situation that either a finite number of standard sizes must be used, which sizes are frequently not optimally configured, or that an individually configured firestop collar must be specially made for each opening.

The object of the invention is to provide a firestop collar that can be adapted easily to opening cross sections of various sizes.

To solve this object, it is provided, in a firestop collar of the type mentioned in the introduction, that the frame is of modular construction.

A frame of modular construction in the firestop collar means in particular that this is constructed from a few common parts and can be configured in diverse ways. This has the advantage that the frame can be adapted individually in place to the opening cross section and that efficient use of material is possible. In particular, the configuration of the simplest embodiment of the firestop collar in the form of a square base element, for example with a size of 200×200 mm, leads to optimum modularity. In addition, a reduction of the parts from which the frame is constructed to a few modular common parts offers further advantages beyond this from the logistical and economic perspective.

The frame of the firestop collar may have several frame parts, which are joined to one another by means of plug-type connectors. As an example for this purpose, slot-like openings in the surface as well as with protruding brackets at the edges of the metal sheets may be provided. This construction permits compact transportation of the frame when it is dismantled to the frame parts, as well as simple and rapid mounting by means of the plug-type connectors.

Preferably, each frame part of the firestop collar is equipped with a front part. These front parts are made in one piece with the frame parts and engage on the block of optionally intumescent material on its side facing away from the wall or ceiling. This configuration of the frame ensures that the block of optionally intumescent material is securely fastened and in the event of fire expands directionally, in order to bring its fire-protection properties optimally into effect.

In a preferred embodiment, the front parts are constructed separately from the frame parts and can be joined therewith by means of plug-type connectors. By means of this configuration, it is possible to configure the frames individually as well as to dismantle and thus transport them in even more compact form.

Advantageously, one of the front parts is joined to two frame parts. In this way, the front parts may be used additionally for joining the frame parts to one another, thus obviating the need for additional fastening elements.

In a preferred embodiment, the front part extends along a side rim of the frame. This configuration permits optimum seating of the block of optionally intumescent material and increases the stability of the frame.

In a further advantageous embodiment, the front part extends as a straight part. Hereby the front part can be fabricated more simply and inexpensively and can be stored and transported in more compact form.

Preferably, the frame of the firestop collar is formed from one continuous strip, which is cut to the desired length and the end of which is joined to its beginning. In this way, the frame can be adapted individually to various opening cross sections.

The frame of the firestop collar preferably consists of sheet metal. This material has high strength in combination with light weight, can be easily processed and is inexpensive.

The firestop collar is preferably fastened by means of a plurality of fastening brackets on its frame parts. These permit secure fastening of the firestop collar to walls and ceilings and, for example, they can be joined to the frame parts via plug-type means. For fastening, the firestop collar may be placed directly on the wall. An additional frame is not necessary, nor is double framing. It is also possible to mount the firestop collar directly over an already present firewall, so that it acts as a repair wall.

The height of the block of optionally intumescent material is preferably slightly greater than the height of the frame parts. Hereby the firestop collar has a projecting length of intumescent material on the wall side, and so this is pressed with preload against the surface of the wall or ceiling during mounting. Preferably, this projecting length is 2 mm to 6 mm, which leads to an optimum contact pressure effect to ensure imperviousness toward smoke gas.

In a preferred embodiment, an intumescent inner lining is disposed between the frame and the block of optionally intumescent material. In the event of fire, the heat causes the intumescent inner lining to be activated and to expand. Preferably the block consists of intumescent material, so that, by using, for the intumescent inner lining and the block of intumescent material, various intumescent materials with different properties, for example with respect to activation temperature and expansion behavior, the pressure variations can be adapted in such a way over the duration of the fire that the stability of the resulting ash crust of the intumescent block is improved. These features make it possible to cover much larger opening cross sections with this firestop collar, without causing the stability problems known from the prior art to occur.

In one embodiment, the block consists of a foamable material. Hereby sound absorption is also ensured in addition to imperviousness to smoke gas. In one preferred embodiment, the block consists of a foamable binding agent, which contains at least one ash-forming and optionally intumescent substance mixture. This binding agent acts as a composite-forming carrier for the ash-forming and optionally intumescent substance mixture. Preferably, the substance mixture is distributed homogeneously in the binding agent. The composite-forming carrier is preferably chosen from the group consisting of polyurethanes, phenol resins, polystyrenes, polyolefins such as polyethylene and/or polybutylene, melamine resins, melamine resin foams, synthetic or natural rubber, cellulose, elastomers and mixtures thereof, wherein polyurethanes are preferred.

The ash-forming and optionally intumescent substance mixture comprises the fire-protection additives that are common and known to the person skilled in the art and that foam up in the event of fire, i.e. under the effect of heat, and while doing so form a foam, such as an intumescent material on the basis of an acid-forming agent, a carbon-producing compound and a blowing agent, that prevents the spread of flames. Preferably the intumescent material comprises, as acid-forming agent, a salt or an ester of an inorganic, nonvolatile acid chosen from among sulfuric acid, phosphoric acid and boric acid, as carbon-producing compound, a polyhydroxy compound and/or a thermoplastic or thermosetting polymeric resin binding agent, and, as blowing agent, a chloroparaffin, melamine, a melamine compound, especially melamine cyanurate, melamine phosphate, melamine polyphosphate, tris(hydroxyethyl)cyanurate, cyanamide, dicyanamide, dicyandiamide, biguanidine and/or a guanidine salt, especially guanidine phosphate or guanidine sulfate.

The composite-forming carrier may further contain, as ablative additive, an inorganic compound, which has incorporated water strongly, e.g. as water of crystallization, and does not dry out at temperatures up to 100° C. but releases the water starting at 120° C. in the event of fire and thereby is able to cool temperature-conducting parts, wherein the said compound is preferably an inorganic hydroxide or hydrate, especially aluminum hydroxide, aluminum oxide hydrates or partly hydrated aluminum hydroxides, which release water at fire temperature or when exposed to flames. Other inorganic hydroxides or hydrates that release water when exposed to flames may also be considered, however, such as are described in EP 0 274 068 A2.

Such compounds, which may be used as the substance mixture in the inventive fire-protection inner lining, are known to the person skilled in the art and, for example, are disclosed in the following publications, to which reference is expressly made herewith: DE 30 25 309 A1, DE 30 41 731 A1, DE 33 02 416 A1, DE 34 11 327 A1, EP 0 043 952 B1, EP 0 051 106 B1. EP 0 061 024 B1, EP 0 116 846 B1, EP 0 158 165 B1, EP 0 274 068 A2, EP 1 347 549 A1, EP 1 641 895 B1 and DE 196 53 503 A1.

The molded block is produced by foam molding, such as reaction injection molding (RIM) with foam, corresponding to DE 3917518, e.g. with Fomox® fire-protection foam or with HILTI CP 65GN, a construction material that forms an insulating layer. Materials that can be used for inventive purposes are known from EP 0061024 A1, EP 0051106 A1, EP 0043952 A1, EP 0158165 A1, EP 0116846 A1 and U.S. Pat. No. 3,396,129 A as well as EP 1347549 A1. Preferably, the molded block consists of an intumescent-capable polyurethane foam, such as is known from EP 0061024 A1, DE 3025309 A1, DE 3041731 A1, DE 3302416 A and DE 3411 327 A1.

The block of optionally intumescent material is preferably provided with a reinforcing inner lining. This reinforcing inner lining serves for stabilization of the intumescent crust formed in the event of fire, and it helps to prevent parts of this from falling out of the firestop collar. For this purpose, it is advantageous to position the reinforcing inner lining in the surface of the block of optionally intumescent material, in order to stabilize the outer faces.

The reinforcing inner lining is preferably formed by a mat, a mesh or a fabric. Such a construction offers good penetration of the block of optionally intumescent material, and the reinforcing inner lining retains its stabilizing properties even if structural damage is sporadically present.

In a preferred embodiment, the reinforcing inner lining consists of a temperature-resistant material, for example metal, glass fibers, basalt fibers, carbon fibers or ceramic fibers. A hybrid structure comprising several materials in the reinforcing inner lining is also possible. The higher temperature resistance compared with the optionally intumescent material is advantageous since, in the case in which the block consists of intumescent material, the reinforcing inner lining is not impaired by the temperature that activates the intumescent layer and so is able to exert its stabilizing function in this way.

In a further preferred embodiment, the reinforcing inner lining consists of expanded metal. This is advantageous with respect to the stabilizing effect.

In a preferred embodiment, the block of optionally intumescent material of the firestop collar is a molded part and is inserted in one or more pieces into the frame and is built-in together therewith. The molded parts may have any desired shape, but are preferably regular polyhedra, for example cuboids. This has the advantage that the number of blocks used for the firestop collar can be matched easily to the opening to be sealed. The reduction of the molded parts to a few modular common parts offers further advantages beyond this from the logistical and economic perspective.

In an alternative embodiment, the firestop collar is formed by first mounting the frame and then introducing the block of optionally intumescent material by means of a foam material with intumescent properties. The advantage of this approach is that only the foam material instead of molded parts has to be kept in readiness, and an individually adapted block of optionally intumescent material is obtained automatically by foaming the frame in place.

Further advantages and features will become obvious from the description hereinafter in conjunction with the attached drawings, wherein.

Figure 1:
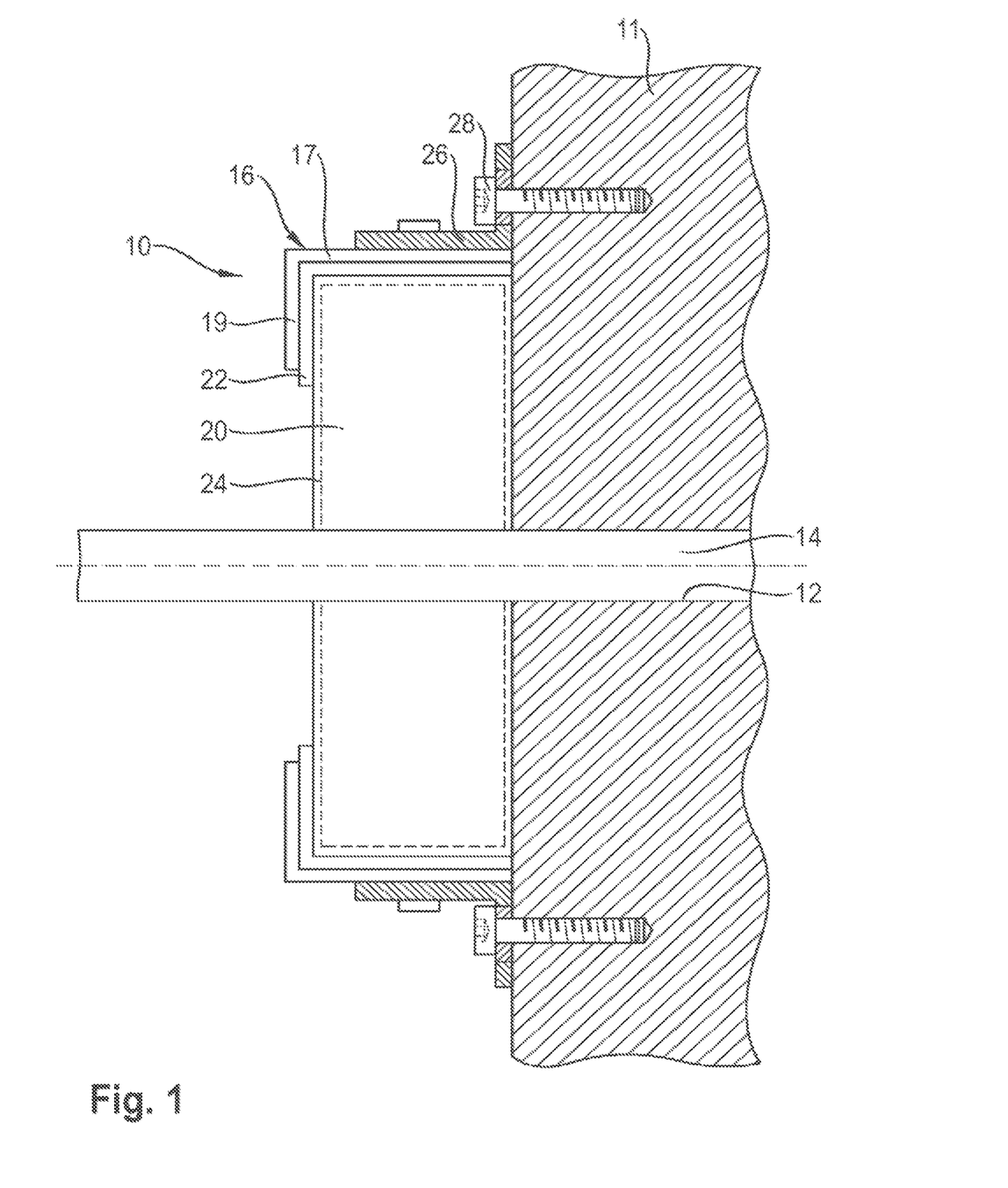
FIG. 1 shows a sectional view of a first embodiment of the inventive firestop collar, which has been attached upstream from a line penetration.

FIG. 1 shows a firestop collar 10, which is attached at an opening, e.g. in a wall 11, upstream from a line penetration 12 of a line 14. The firestop collar contains a frame 16, a block 20 of optionally intumescent material located therein and an intumescent inner lining 22 disposed therebetween.

Frame 16 is joined to wall 11 via fastening brackets 26.

As an example, line 14 is a water pipe of plastic or contains one or more cables.

Frame 16, which may consist of sheet metal, comprises a plurality of frame parts 17, wherein each frame part 17 is equipped respectively with a perpendicularly extending front part 19. Front parts 19 engage on block (20) of optionally intumescent material on its side facing away from the wall, and here are constructed in one piece with frame parts 17. On the side facing away from block 20, a plurality of fastening brackets 26 is provided on these frame parts 17.

Block 20 has a reinforcing inner lining 24, which preferably is integrated into the outer surface of block 20. This reinforcing inner lining 24 may be formed by a mat, a mesh or a fabric, and it preferably consists of a particularly temperature-resistant material, such as metal, glass fibers, basalt fibers, carbon fibers, ceramic fibers or a hybrid material, for example. Alternatively, expanded metal may be used for reinforcing inner lining 24.

Block 20 may be provided as a molded part, for example in the form of a cuboid. In this case, block 20 is preferably slightly larger on the sides than frame 16 surrounding it, in order to guarantee secure seating of block 20 in frame 16. In addition, in an advantageous embodiment, block 20 is higher than frame parts 17, especially 2 to 6 mm, and, by virtue of this projecting length toward the wall side, it may be mounted in such a way on wall 11 that the optionally intumescent material is pressed with preload against the surface.

Alternatively, block 20 may also be formed by a foam material introduced into frame 16. For this purpose, frame 16 including intumescent inner lining 22 is first fastened upstream from line penetration 12 and then the space surrounded by frame 16 is filled by injection molding with an optionally intumescent material. Depending on configuration, reinforcing inner lining 24 may be introduced at various points in time.

Intumescent inner lining 22 is fixed between frame 16 and block 20 and extends along frame parts 17 and the respective front parts 19.

By means of fasteners 28, firestop collar 10 can be fastened to wall 11 via fastening brackets 26 pinned onto frame parts 17. For example, by the fact that screws are used as fasteners 28, the preload of firestop collar 10 can be adjusted by tightening these.

Figure 2:
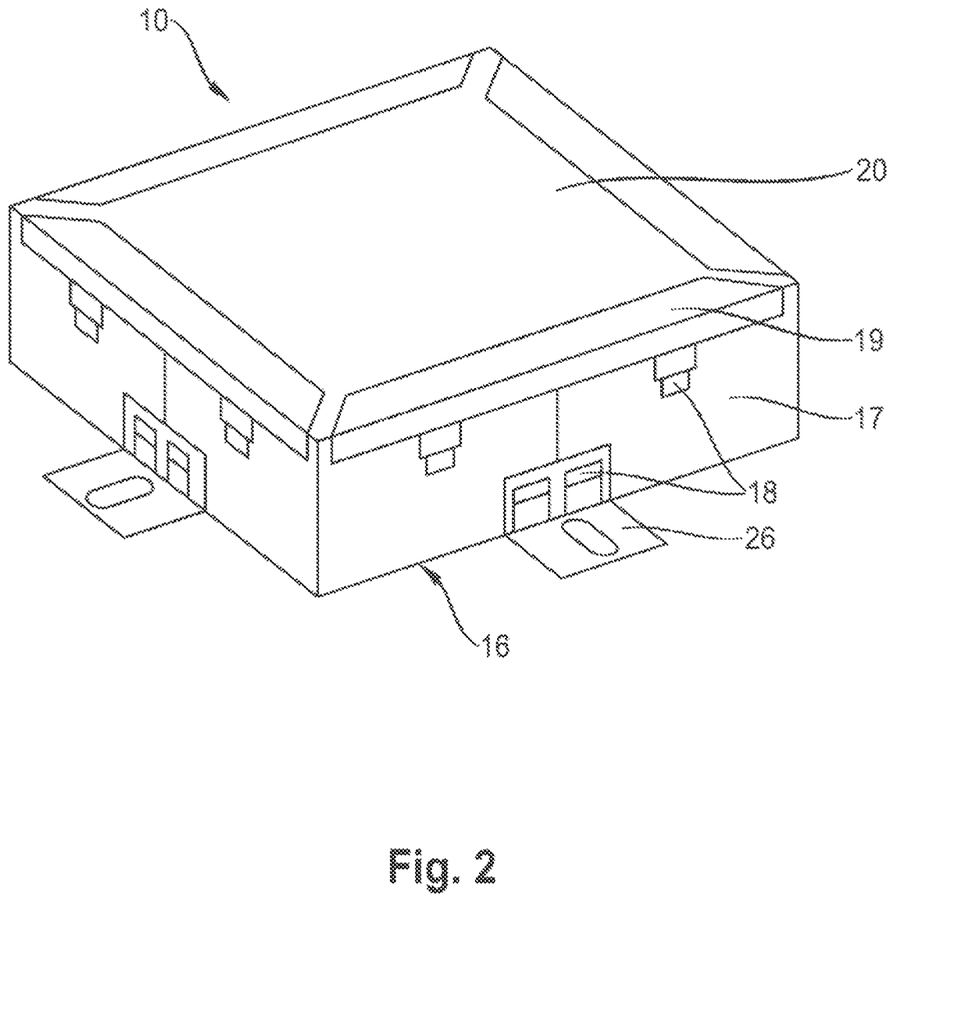
FIG. 2 shows a perspective view of a second embodiment of a modular firestop collar with front parts constructed separately from the frame parts.
Figure 3A:
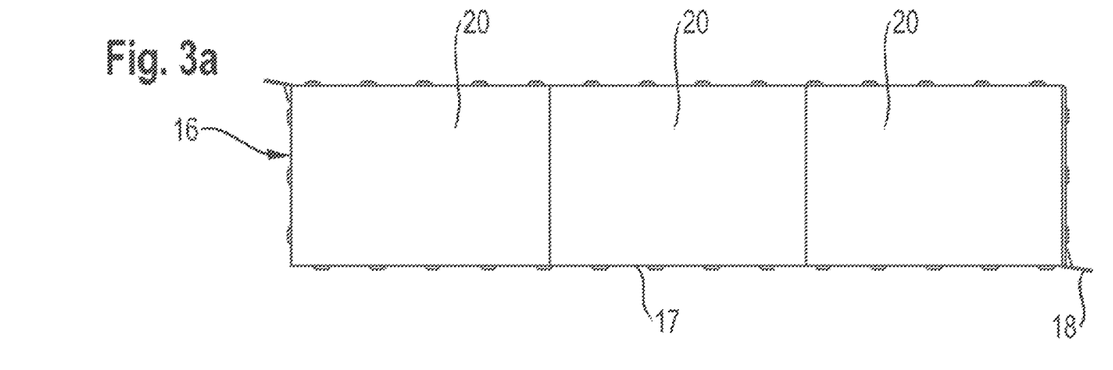
FIG. 3a shows, in a top view in the direction of the face bearing on the wall, a firestop collar with a frame of modular construction according to a third embodiment of the invention.
Figure 3B:
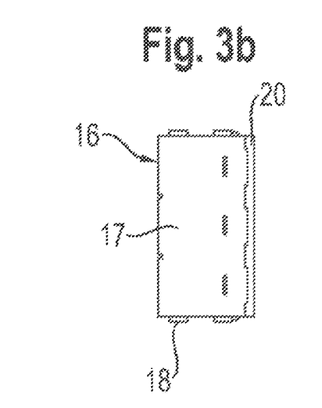
FIG. 3b shows a first side view.
Figure 3C:
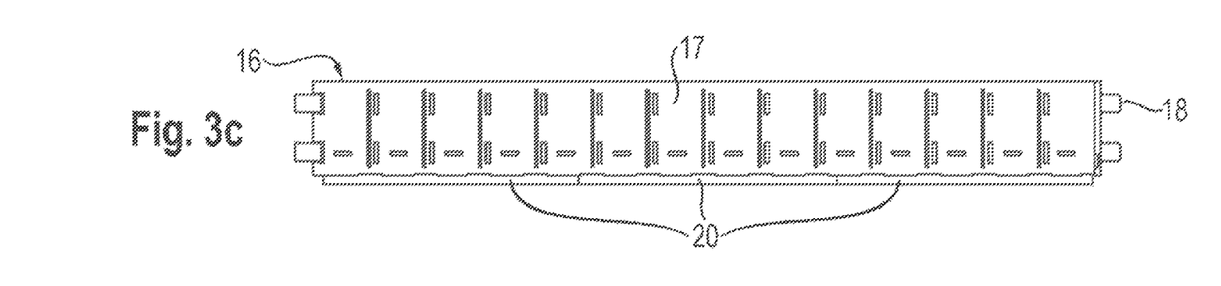
FIG. 3c shows a second side view.
Figure 3D:
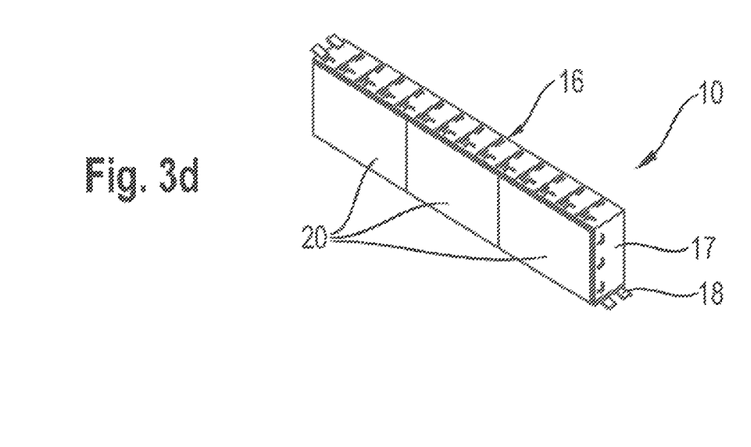
FIG. 3d shows a perspective view of the third embodiment of the inventive firestop collar.

FIG. 2 shows an embodiment of a firestop collar 10 with square base face and modular frame 16. Frame 16 surrounding block 20 of optionally intumescent material consists of a plurality of frame parts 17 as well as separate front parts 19, which are joined to frame 16 by means of plug-type connectors 18. In particular, one front part 19 joins two frame parts 17 with one another.

Front parts 19 are straight and extend along one side rim of frame 16. In this way they brace block 20 of optionally intumescent material on its side facing away from wall 11 or the ceiling and at the same time serve as connecting members between frame parts 17.

Via fastening brackets 26, frame parts 17 are mutually joined additionally to one another by means of plug-type connectors 18. Preferably, frame parts 17 consist of straight sheet-metal pieces, which can be bent at right angles at a predetermined bending point and thus may be optionally used as corner pieces or as straight frame part 17 for frame 16.

Alternatively, however, it is also possible to construct frame 16 from straight frame parts 17 and to be able to bend front parts 16 and/or fastening brackets 26 into corner pieces or to configure them as corner pieces.

In the embodiment shown, firestop collar 10 consists of a square block 20 of optionally intumescent material as well as a frame 16 of respectively four identical frame parts 17, front parts 19 and fastening brackets 26.

On the basis of the modular structure, firestop collar 10 can be configured in diverse ways and adapted to various opening cross sections. Thus it is possible, for example, to imagine an embodiment (not illustrated) with two or three blocks 20 of optionally intumescent material and a corresponding number of respectively six or eight frame parts 17, front parts 19 and fastening brackets 26, wherein blocks 20 of optionally intumescent material 20 are not provided on their mutually adjoining sides with a frame 16 in this case but instead frame 16 joins blocks 20 of optionally intumescent material with straight frame parts 17 and thus completely encircles them.

FIGS. 3a to 3d show a further embodiment of a firestop collar 10 with modular frame 16 in various views. Frame 16 consists of a plurality of frame parts 17, which are joined to one another by plug-type connectors 18.

In the illustrated variant, firestop collar 10 consists of three rectangular blocks 20 of optionally intumescent material and one frame 16 of two L-shaped frame parts 17. These L-shaped frame parts 17 may also be straight strips, which in particular were bent in place at right angles, in order to form a frame 16 adapted to the opening cross section.

In one embodiment (not illustrated), frame 16 is formed from one continuous strip, which is cut to the desired length and joined at its ends.

In particular, firestop collar 10 is dimensioned such that fire-resistance class EI 120 is achieved even for walls with a thickness of 100 mm.

In the marketplace, moreover, it is possible to offer firestop collar 10 not only as a complete set but also as individual parts thereof. In particular, frame 16 and block 20 of optionally intumescent material may be sold individually.

The invention claimed is:

1. A firestop apparatus, comprising:
   a frame comprising at least two metal frame parts configured to removably couple to one another, and
   an intumescent material having a rectangular shape,
   wherein the intumescent material is configured to be disposed in an interior space of the frame between the at least two metal frame parts,
   wherein the intumescent material has at least two side edges and at least one opening between the at least two side edges, the at least one opening configured to receive a pipe, cable, or of line through the interior space of the frame,
   wherein the at least two metal frame parts each comprise a right-angle bend which is suitable as a corner part of the frame,
   wherein the at least two metal frame parts each comprise one or more fastening brackets, each configured to fasten the firestop apparatus to a wall with a screw,
   wherein the at least two metal frame parts each comprise a front part configured to partially overlap the interior space of the frame in an axial direction,
   wherein the frame has an opening between the front parts, wherein the opening between the front parts is larger than the at least one opening in the intumescent material in at least one dimension, wherein a first metal frame part of the at least two metal frame parts has a slot, and wherein a second metal frame part of the at least two metal frame parts has a protrusion configured to form a first connector with the slot of the first metal frame part, wherein the first connector is capable of at least partly removably connecting the first metal frame part and the second metal frame part.

2. The firestop apparatus of claim 1, wherein the at least two metal frame parts each comprise sheet metal.

3. The firestop apparatus of claim 1, wherein a width of the at least one opening in the intumescent material is smaller than a width of the interior space of the frame.

4. The firestop apparatus of claim 1, further comprising, in at least one direction, an inner lining between the frame and the intumescent material.

5. The firestop apparatus of claim 4, wherein the inner lining is an intumescent inner lining.

6. The firestop apparatus of claim 1, wherein each front part of the at least two metal frame parts is of one piece with a corresponding frame part.

7. The firestop apparatus of claim 1, wherein the second metal b frame part has a slot, and wherein the first metal frame part has a protrusion configured to form a second connector with the slot of the second metal frame part, wherein the second connector is capable of connecting the second metal frame part and the first metal frame part.

\* \* \* \* \*

UNITED STATES PATENT AND TRADEMARK OFFICE
CERTIFICATE OF CORRECTION

PATENT NO. : 11,628,321 B2
APPLICATION NO. : 17/934364
DATED : April 18, 2023
INVENTOR(S) : Herbert Muenzenberger et al.

It is certified that error appears in the above-identified patent and that said Letters Patent is hereby corrected as shown below:

In the Claims

Column 6, Line 56, in Claim 1 currently reads "or of line" and should read --or line--; and Column 7, Line 26, in Claim 7 currently reads "metal b frame" and should read --metal frame--.

Signed and Sealed this
Twenty-seventh Day of June, 2023

Katherine Kelly Vidal
*Director of the United States Patent and Trademark Office*